United States Patent [19]
Brueckner et al.

[11] Patent Number: 5,233,510
[45] Date of Patent: Aug. 3, 1993

[54] CONTINUOUSLY SELF CONFIGURING DISTRIBUTED CONTROL SYSTEM

[75] Inventors: Roger D. Brueckner, Phoenix; Hugh W. Littlebury, Chandler, both of Ariz.

[73] Assignee: Motorola, Inc., Schaumburg, Ill.

[21] Appl. No.: 766,303

[22] Filed: Sep. 27, 1991

[51] Int. Cl.$^5$ .............................................. G05B 15/20
[52] U.S. Cl. ..................... 364/131; 364/141; 364/138
[58] Field of Search ............... 364/131, 192, 141, 143, 364/138; 371/16.5; 395/275, 375

[56] References Cited
U.S. PATENT DOCUMENTS

| | | |
|---|---|---|
| 4,334,307 | 6/1982 | Bourgeois et al. .................. 371/16.5 |
| 4,558,413 | 12/1985 | Schmidt et al. ...................... 395/600 |
| 5,042,002 | 8/1991 | Zink et al. ........................... 395/375 |

Primary Examiner—Jerry Smith
Assistant Examiner—Paul Gordon
Attorney, Agent, or Firm—Joe E. Barbee

[57] ABSTRACT

A method of continuously self configuring a distributed control system. The method comprises scanning a plurality of potential address codes to locate an active object (13). Software senses an identity code (17) which is associated with the active object (13). Then a machine map (14) is built which provides the current address code (15, 31) of the active object (13). Within a network (28), a network map (21) is constructed by getting information from the appropriate machine map (14) for each computer (23). The network map (21) provides the current network address (32) of each active object (13) available to the network (28).

12 Claims, 2 Drawing Sheets

CONTINUOUSLY SELF CONFIGURING DISTRIBUTED CONTROL SYSTEM

BACKGROUND OF THE INVENTION

The present invention relates, in general, to software development, and more particularly to software development for a system to control physical objects.

In an automated factory environment the tasks performed often require interaction of several pieces of equipment, so equipment is often linked together by a computer network to facilitate the exchange of information. Use of such a computer network allows great flexibility in reconfiguring the equipment to accommodate changes in production needs. However this very usefulness makes the reliability of the computer network a critical element in determining the factory's output. If the computer network is slowed or stopped for any reason then the entire factory output slows or stops. Great emphasis is placed on avoiding any situation which would degrade the performance of the computer network.

Typically equipment in such an environment is designed specifically to allow the greatest possible flexibility in configuration. For example using a computer interface which is interchangeable with all other computer interfaces throughout the network. Thus equipment may be connected to many different computers within the network to perform the same task. Operations are broken down to their most fundamental tasks which are then performed by equipment designed for that task under computer control. The concept of an object is often used to designate a distinct portion of equipment which can be controlled by a computer. These objects typically comprise some equipment such as a robot arm, a display, a sensor, a control such as a door lock, or a complex piece of equipment which itself has imbeded computers. An object may be physical hardware, yet another software process, or some combination of hardware and software which performs a predetermined function. For automated testing of semiconductor components, the objects typically comprise such functions as parts handlers and feeders, devices which apply a specific electrical signal to a part being tested, and sensors which measure the electrical output of the part. Various operator functions are often sensed in this way for convenience. A control as simple as a "start" button may in fact be sensed under software control and actually act to trigger the start of a software process comprising several hundred steps. Typically all of the objects within a system use the same physical interface to the computer system, for example the plug-in expansion slots provided with a typical personal computer system. These expansion slots comprise a connector mounted on a motherboard into which a printed circuit board connector can be inserted to provide some specialized capability. In this way one interface board may readily be used with many different computers.

In designing such a system, it is essential that the software exchange information and commands only with a specific preselected object. Typically this is achieved by the use of a unique "object address code" which is assigned to every object which can be connected to the system. This object address code may take many forms. An object's address code may be a specific code on a bus, a dedicated location within a computer memory, or a specific code signal which is exchanged as part of each message. Whatever its physical form, the object address code is typically arranged so that the software uses a single code for the address. This code is then used by special purpose "device handler" software to actually exchange information with the desired object.

The method of assigning a unique address to each object is typically used regardless of whether the object is attached directly to the computer which is controlling the object or the object communicates through a computer network of some kind. The form of the address is simply extended to include some form of network wide identification in addition to the local computer address. The use of networked computers to communicate with objects which are physically remote from the controlling computer allows a single computer to control a very large number of objects. A single small computer could easily have the potential to control several thousand objects at one time. With this many objects and associated object addresses the management tasks are significant. It is necessary to keep track of the functionality and capability of each object as well as ensuring that no two objects share an address. Conversely, it is also desirable to minimize the number of unused addresses due to computer memory constraints and the need to communicate the address between the computer system and the object being controlled.

The earliest software of this type used address codes which were coded into the software. This required that the complex software be changed for even a minor change in hardware configuration. This was extremely time consuming and often introduced errors due to the changes. In addition, such changes required highly skilled programming personnel to perform. A better method was to use an external table as a map, independent of the software process, which allowed the software to find the actual address of an object by finding a code which identified that object within the map. This allowed a special software process to edit and revise the addresses within the map without altering the complex main software. This method still required that a specially trained person actually perform the changes however. Both methods suffered from the deficiency that the computer and objects had to be shut down to change the master map. With a large computer network comprising several hundred computers and objects being controlled, this requirement severely reduces both the useful operational time of the system and the flexibility to reconfigure the system as required.

Frequently it is necessary to start a new task, for example whenever the mix of products being produced is altered or a piece of equipment must be restocked. When this desired task uses computer controlled equipment, the software must ensure that the appropriate equipment is available. In other words, to successfully perform the desired task a satisfactory solution for the equipment requirements must be found. This is typically called a "resolution" of the equipment requirements. For the equipment requirements of a task to be resolved implies that some means to communicate with each piece of equipment be provided to the task. In the prior art this is sometimes achieved by means of a fixed mapping of the equipment, typically generated when the entire network was started. This fixed map is then used to automatically configure the system operating software to allow communication with each piece of equipment. This is the method which is typically used with a personal computer, for example. Alternatively the system operating software may be configured to communicate with every type of equipment which could be connected to the system. Using this approach, every time a new task is started all equipment which might be connected to every machine within the network must be tested to determine what equipment is currently available. This search is extremely time consuming with large networks where many thousand pieces of equipment could be found. This search may take several minutes to complete, during which time execution of other tasks is delayed or halted. The delayed tasks reduce the output of the equipment they control. The prior art thus requires either stopping and restarting the system frequently or delaying work in progress whenever a new task is started while a search is performed. Either alternative severely reduces the productivity of the factory which uses this equipment.

There is a need for a control scheme which can be revised without requiring that the entire computer network be removed from service and without requiring intervention by a human operator. Furthermore it would be desirable to allow any object to be used wherever it is needed throughout the network. The rest of the network would be undisturbed during this process and the object would be functional as soon as it was reconnected. Similarly, objects which fail or are upgraded can simply be removed and reconnected as desired. Commonly encountered situations such as starting a new task must be handled without degrading the output of the equipment being controlled. A scheme which meets all of these requirements would allow a factory to operate at its fullest potential, with equipment being moved, altered, and restarted while other equipment continues to operate uninterrupted.

SUMMARY OF THE INVENTION

Briefly stated, the present invention provides a method of continuously self configuring a distributed control system. The method comprises scanning a plurality of potential address codes to locate an active object and sensing the identity codes associated with the active objects. Then a machine map is built which provides the current address of the active object. Within a network, a network map is constructed by getting information from each machine map. The network map provides the current network address of every active object on the network.

DETAILED DESCRIPTION OF THE DRAWINGS

Figure 1:
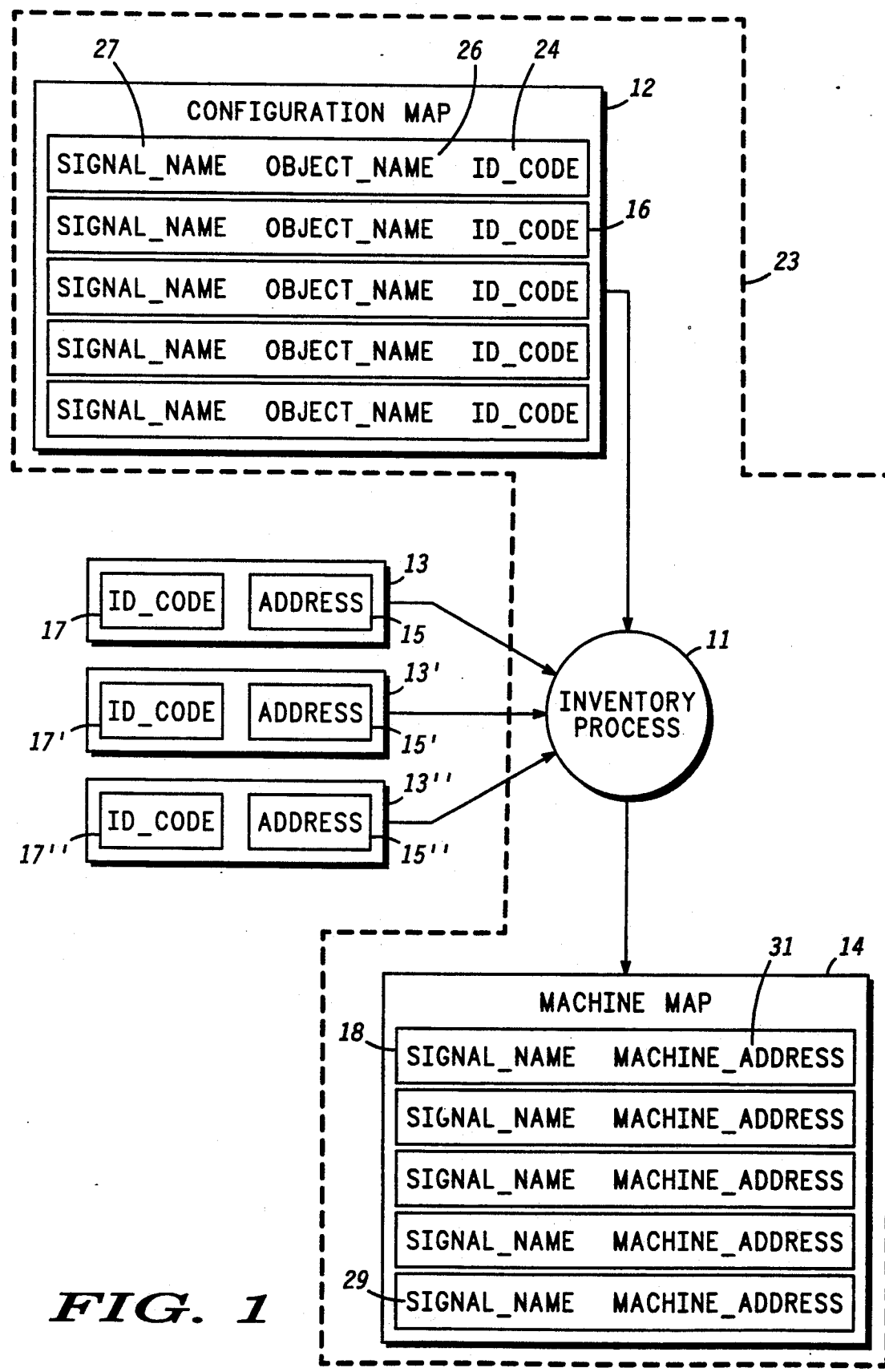
FIG. 1 shows a diagrammatic view of a self configuring system as a preferred embodiment of the present invention.
Figure 2:
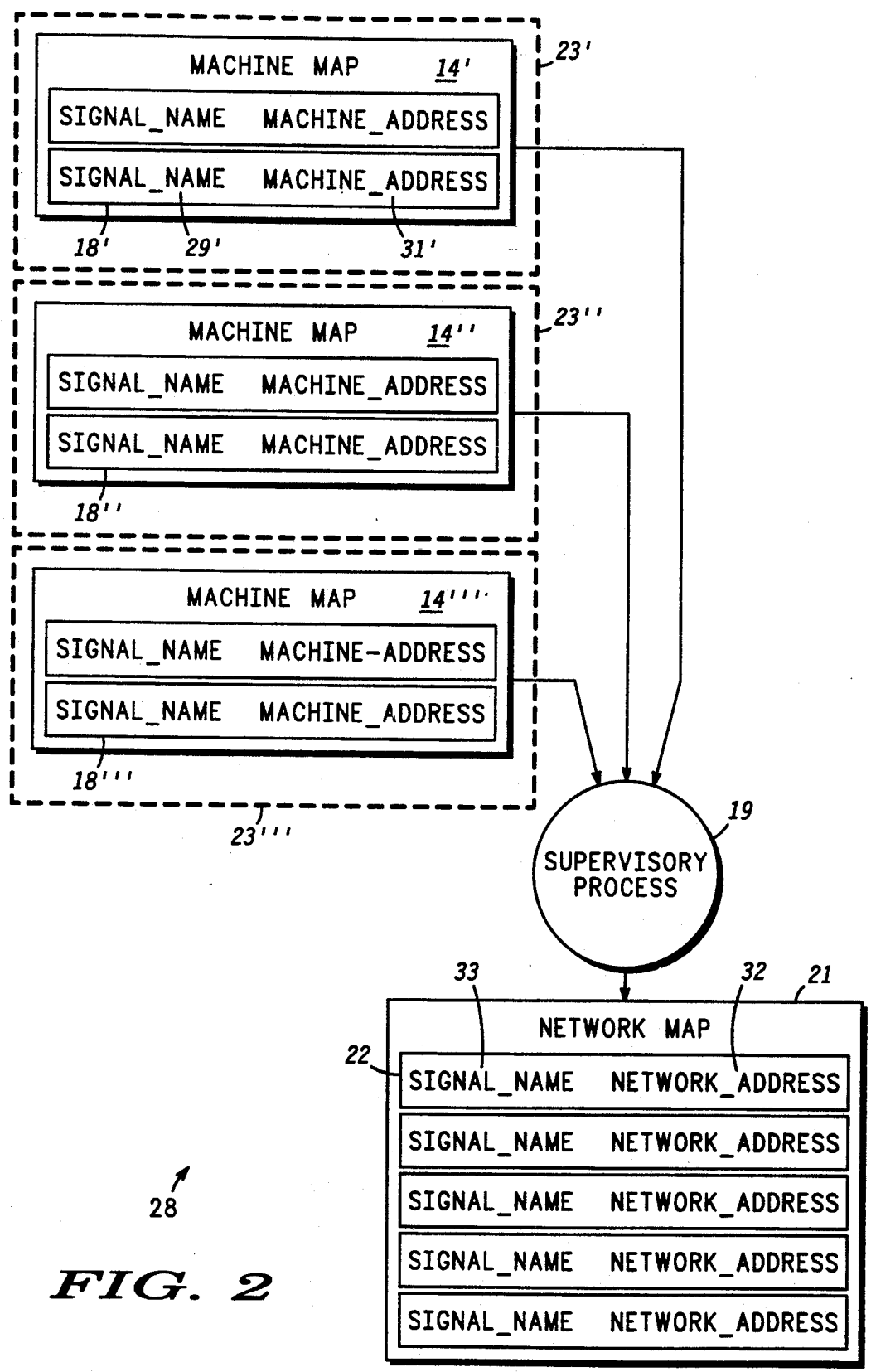
FIG. 2 shows a diagrammatic view of a self configuring network as an extension of the embodiment shown in FIG. 1.

FIG. 1 shows a diagrammatic view of a self configuring control system as a preferred embodiment of the present invention. For clarity and brevity, the hierarchical input process output method is used to specify the tasks required. The method is based on the Yourden methodology as outlined in "The Practical Guide to Structured Systems Design", by M. Page-Jones, published by Prentice-Hall in 1980, which is incorporated herein by reference. Using this method the various software procedures required are defined in terms of the information which is to be input into the process and the resulting output from the process, together with the overall structure of data flow. This enables a person of ordinary skill in the art to implement equivalent software in many different forms, using a wide variety of computer hardware, compilers and operating systems while still ensuring that the required functions are performed. Various generic elements are shown in FIG. 1 and FIG. 2 which comprise a plurality of similar elements. For clarity similar elements are shown with the same number suffixed with a prime. For example an object 13 represents the family of equipment which is controlled by a control means 23. Object 13 comprises a sub-system such as the hardware and software required to control hardware such as a device handler, robot arm, display or sensor. Other elements which are similar to object 13 are shown as an object 13', an object 13' and an object 13". These elements are identical to the original item except that they may contain different information or functional capabilities internally.

Control means 23 typically comprises a computer control system. Such a computer control system comprises the computer hardware and associated software which is programmed to perform the required control function. An address code 15 and an identity code 17 are associated with each object 13. Address code 15 typically comprises a numeric code which is used for communication in ways well known in the art, such as being passed on a computer bus and sensed only by the specific object 13 with which communication is desired. Address code 15 thus comprises a means by which control means 23 ensures communication with a specific desired object 13. Identity code 17 serves to uniquely identify the specific object 13 which is controlled by control means 23 when object 13 is present and is in an active state. A specific object 13 is considered to be in an active state when control means 23 is able to communicate with that object 13. When object 13 is in an active state, control means 23 may sense identity code 17 by using address code 15 together with a predetermined command. When object 13 is in an inactive state it will not be possible to sense identity code 17 associated with that specific object 13. If object 13 is in an inactive state it may be switched off, defective, or physically removed from the system.

An inventory process 11 is typically part of the software portion of control means 23 and so is able to communicate with object 13. Inventory process 11 gets information from a configuration map 12 to determine which objects 13 can be connected to control means 23. Configuration map 12 comprises a plurality of configuration records 16. Each configuration record 16 comprises a summary of characteristics which are associated with the related object 13. The characteristics of object 13 typically comprise information such as an object name 26 which is a mnemonic related to the object's generic function, a signal name 27 for each function which the object may perform, and a unique identity code 24 for the object. Typically each object 13 will comprise a plurality of functions and so will be matched with more than one signal name 27 in configuration map 12. In many alternative embodiments of the present invention, configuration map 12 will also include detailed information concerning function and capabilities of each object 13.

Object name 26 typically comprises a mnemonic identification for one object 13 which is used by a software process to select that specific object 13. Signal name 27 is a mnemonic identification for a predetermined signal associated with one specific object 13. Signal name 27 is typically used with object name 26 to communicate a predetermined function which is associated with the specific object 13. For example one signal name 27 may designate the pin of a particular electrical connector of one object 13 which is driven to zero volts when a button is depressed. A software process may designate this signal name 27 as the "start" signal, and the button as the "start" button. Upon sensing a voltage of zero volts the software process will begin performing some function. In this example signal name 27 would typically also be "start". Another example of signal name 27 would be a display light which is lit under software control when desired, and would typically be a mnemonic associated with the function being indicated by the light.

Control means 23 will typically contain a means for sensing identity code 17 associated with one specific predetermined object 13 having predetermined address code 15. Inventory process 11 scans the plurality of potential address codes 15 according to a predetermined sequence, attempting to sense one of the identity codes 17. If one object 13 having predetermined address code 15 is in an active state then control means 23 causes object 13 to respond with the predetermined identity code 17 which matches that specific object 13. Inventory process 11 then adds this information to a machine map 14. Machine map 14 comprises a plurality of machine map records 18. Machine map records 18 in turn comprise a signal name 29 and a machine address code 31. Inventory process 11 builds machine map 14 by copying signal name 27 to become signal name 29 and copying predetermined address code 15 to become machine address code 31. This procedure is repeated until all potential address codes 15 have been scanned and the ones associated with active objects are stored in machine map 14. At this point machine map 14 has been built and provides at least the current address 31 of each active object 13. If no identity code 17 is sensed but predetermined address code 15 matches a machine address 31, the associated object 13 is no longer active. Machine map 14 is then revised to remove the associated machine map record 18. Inventory process 11 is run according to a predetermined schedule. Inventory process 11 revises machine map 14 to add any signal name 27 associated with any object 13 which is in an active state but has no machine map record 18. Similarly, inventory process 11 removes any machine map record 18 which is associated with any signal name 27 within any object 13 which is no longer in an active state. Thus machine map 14 accurately reflects the actual inventory of every object 13 in an active state which is controlled by control means 23. At this point object 13 may be used by a software process to perform a desired task as described below.

Alternative embodiments of the present invention save additional detailed information about function and capabilities of objects 13 in machine map 14 and revise this detailed information using the same procedure as described above. This would be necessary if there is a change to the physical structure of object 13 such as shutting down a sensor which is part of that object 13. In this case object 13 would send a status code together with identity code 17 which would then be used to determine whether the additional detailed information should be changed. Another alternative embodiment runs inventory process 11 based on sensing of configuration changes, user process completion or other such system events.

FIG. 2 shows a diagrammatic view of a self configuring network 28 as an extension of the embodiment shown in FIG. 1. The network depicted in FIG. 2 includes a plurality of similar control means 23', 23'', and 23'''. For clarity only a machine map 14', 14'', and 14''' is shown within control means 23', 23'', and 23''', respectively, however it should be understood that they also include all elements of control means 23 shown in FIG. 1. Typically object 13 (FIG. 1) is designed to be connected to any one of the control means 23', 23'', or 23''' within a computer network 28 so as to allow the maximum flexibility in configuring the capabilities of computer network 28. A supervisory process 19 reads each machine map 14', 14'' and 14''' for each control means 23', 23'', and 23'''. Supervisory process 19 creates a network map 21 comprising a plurality of network map records 22. Each network map record 22 comprises at least a signal name 33 and a network address code 32. Signal name 33 is a copy of signal name 29, from machine map 14'. Network address code 32 comprises a copy of machine address code 31' combined with a network code which serves to identify that this control means 23' is associated with this machine address code 31'. Supervisory process 19 is re-run according to a predetermined schedule. Supervisory process 19 then revises network map 21 to add any machine map record 18' having no matching network map record 22. Similarly, supervisory process 19 removes any network map record 22 which does not have a matching machine map record 18'. Alternative embodiments run supervisory process 19 based on sensing of events such as hardware changes, user process completion, or running of inventory process 11 (FIG.1).

The result is that network map 21 allows the equipment which is associated with any signal name 33 to be used by a process regardless of where the equipment is connected within the entire computer network 28. In other words, object 13 (FIG. 1) may be controlled by any control means 23', 23'', or 23''' within computer network 28 and continue to operate without requiring either hardware or software revisions. At all times the correct location and status of the particular object 13 (FIG. 1) required to perform a desired function is known by computer network 28 and associated software.

Using the present invention a software process which will control the machinery in performing a desired task begins by sending a list containing signal names 33 to supervisory process 19. The list of signal names 33 corresponds to a mnemonic code for the equipment required to perform the desired operation. Supervisory process 19 finds an entry in network map 21 for each signal name 33, and returns the network address code 32 which corresponds to each signal name 33. Thus supervisory process 19 serves as a means to resolve the hardware required for the desired operation by getting information from network map 21 without the user's process caring about the actual location of the hardware. To truly resolve the equipment requirements, supervisory process 19 must also detect and deal with situations which prevent running of the desired task, such as some equipment which is required by the desired task not being available. In this case supervisory process 19 either might attempt to substitute different equipment or call for corrective action. If all equipment requirements cannot be resolved then supervisory process 19 must delay the desired task until all equipment requirements can be resolved. Once all requirements of the desired task are resolved, supervisory process 19 supplies the desired task with a copy of network addresses 32 which are associated with the required equipment. Supervisory process 19 then allows the desired task to proceed. A network support process is typically used to facilitate communication between the desired task and the specific equipment designated by network address 32. The desired task thus uses network address 32 combined with the network support process as a means to control the equipment which it requires.

Equipment which is controlled by the system can be shut down, moved and reconnected without affecting other computer operations. Changing equipment to accommodate new production needs requires only that the particular equipment affected be disconnected, the needed changes performed, and reconnected where it is needed. The inventory process and supervisory process detect these actions and adjusts the software which is being run to use the equipment which is currently available. A piece of equipment which is not being reconfigured simply continues to operate normally. Likewise repairs, maintainence and upgrades affects only the particular piece of equipment which requires the work. At the same time actual operation of the distributed control system as a whole is made easier and more reliable. The entire distributed control system is no longer affected by shutting down a single piece of equipment so productivity of all of the equipment is increased. In contrast to the prior art, starting a new task may be accomplished without impacting tasks which are already running. Network map 21 provides an up to date inventory of all equipment which is currently available to the task. No searching or other testing is required since supervisory process 19 can resolve all equipment requirements for the new task. As a result, this frequently performed operation is accomplished without slowing or stopping all equipment which is connected to the network.

Software intended for a specific application, also known as a software control process, need not know the actual location of the equipment nor even if the equipment is available for use, this is all done by a supervisory process which keeps track of the current status and location of all equipment. The chore of locating equipment is highly dependent on the particular characteristics of distributed control system on which the software is to run. This results in frequent changes to the software being required. If software which is intended to control equipment must also locate that equipment and determine if it is operating significant effort is added to its development. The present invention allows the control process software to be independent of the objects which it controls and senses. These objects may be physical hardware, software, or some combination of the two without affecting the control process software in any way. The connection of the control process software to a physical object is a three step process. First, the control process software is written using a logical name for each object. The programmer of the control process software is not concerned with physical objects, just with their logical name. Next, during installation of the control process software on the computer system, these logical names are assigned to actual objects which are available for use. The logical names may be reassigned whenever necessary. Finally during start-up of the equipment, the objects are located and the network map updated with the object addresses. If an object becomes available or unavailable during running of the control process software, the network map is updated. While the control process software is running it uses the network map to directly locate and control each object. Thus the object addresses are made available to the control process software directly, almost as though the object addresses were hard coded into the control process software itself. This provides fast, real-time access to the object without intermediate software or delays of any kind. Thus development of application software for the distributed control system is much simplified by the use of the present invention, both by reducing the complexity of the task and by reducing the changes required for integration into a particular network.

By now it should be clear that the present invention provides a method whereby the techniques of automated inventory management are applied to equipment which is controlled through a computer network. This allows a distributed control system to be reconfigured without being shut down or requiring a search by every task to locate the equipment required by that task. The net result is much increased output for the equipment and hence for the entire factory.

We claim:

1. A method of continuously self configuring a distributed control system, comprising:
   providing at least one object with an identity code;
   providing at least one control computer;
   communicating between the object and the control computer using a predetermined address code;
   providing a configuration map having detailed information concerning function and capabilities of each object which is expected to be active;
   running an inventory process on the control computer;
   getting information from the configuration map by the inventory process;
   sensing the identity code of any object which is in an active state by the inventory process;
   building a machine map which contains at least the object's identity code, the object's address code, and a copy of the detailed information from the configuration map;
   building a network map to reflect the current contents of all machine maps within the network;
   revising the machine map according to a first predetermined schedule to add any object which is newly in an active state;
   further revising the machine map to reflect any changes in the detailed information from the configuration map;
   removing the machine map entry for any object which is not in an active state; and
   revising the network map according to a second predetermined schedule to reflect the current contents of all machine maps within the network.

2. A method of continuously self configuring a distributed control system, comprising:
   scanning a plurality of potential address codes to locate an active object;
   sensing an identity code which is associated with the active object;
   building a machine map which includes at least a current machine address which is associated with the active object;

building a network map by getting information from the machine map, the network map providing at least a current network address of the active object; and repeating the above steps until all active objects are reflected in the machine map and the network map.

3. The method of continuously self configuring a distributed control system of claim 2 further comprising:

sensing an object which is no longer active; and revising the machine map to remove the object which is no longer active.

4. The method of continuously self configuring a distributed control system of claim 2 further comprising:

sensing a previously inactive object which becomes active; and revising the machine map to add the active object.

5. The method of continuously self configuring a distributed control system of claim 2 wherein the machine map further comprises additional detailed information concerning a function of the active object.

6. The method of continuously self configuring a distributed control system of claim 5 further comprising:

revising the machine map to reflect physical and operational changes to the active object.

7. The method of continuously self configuring a distributed control system of claim 2 further comprising:

resolving hardware requirements for a desired task by getting information from the network map.

8. The method of continuously self configuring a distributed control system of claim 2 further comprising:

revising the network map to ensure that it reflects accurately the contents of each machine map.

9. A continuously self configuring distributed control system comprising:

an identity code which is associated with an active object and serves to uniquely identify the active object within a network;

an inventory process which senses the identity code and an associated address code for the active object;

a machine map, created and revised by the inventory process, which comprises a cross reference between at least the identity code and the associated address code for the active object;

a supervisory process; and a network map based on the machine map which is created and revised by a supervisory process and provides a current network address code for the active object upon request by a user process.

10. The continuously self configuring distributed control system of claim 9 further comprising:

means for resolving a hardware requirement for a desired task by getting information from the network map; and means for allowing the desired task to control an item of required equipment by getting information from the network map.

11. The continuously self configuring distributed control system of claim 9 further comprising:

a configuration map having detailed information concerning a capability of an object which is expected to be active.

12. The continuously self configuring distributed control system of claim 11 wherein the configuration map associates a predetermined signal with a predetermined function of the object which is expected to be active.

* * * * *